(12) United States Patent
Guymon, III et al.

(10) Patent No.: US 7,995,064 B2
(45) Date of Patent: Aug. 9, 2011

(54) COMPUTER-IMPLEMENTED CHAT SYSTEM HAVING DUAL CHANNEL COMMUNICATIONS AND SELF-DEFINING PRODUCT STRUCTURES

(75) Inventors: Vernon Melvin Guymon, III, Menlo Park, CA (US); Eric Nathan Ries, Palo Alto, CA (US); William David Harvey, Palo Alto, CA (US); Matt Danzig, Menlo Park, CA (US); Marcus Gosling, San Francisco, CA (US)

(73) Assignee: IMVU, Inc., Palo Alto, CA (US)

( * ) Notice: Subject to any disclaimer, the term of this patent is extended or adjusted under 35 U.S.C. 154(b) by 121 days.

(21) Appl. No.: 11/213,492

(22) Filed: Aug. 26, 2005

(65) Prior Publication Data

US 2006/0077205 A1    Apr. 13, 2006

Related U.S. Application Data

(63) Continuation-in-part of application No. 10/964,356, filed on Oct. 12, 2004, now abandoned, and a continuation-in-part of application No. 11/035,926, filed on Jan. 13, 2005, now Pat. No. 7,912,793.

(51) Int. Cl.
*G06T 15/70* (2006.01)

(52) U.S. Cl. ............ 345/473; 345/474; 463/31; 463/42; 715/751; 715/753; 715/758

(58) Field of Classification Search .................. 345/473, 345/474, 751; 715/757, 758, 751, 753; 463/31, 463/42
See application file for complete search history.

(56) References Cited

U.S. PATENT DOCUMENTS

| | | | |
|---|---|---|---|
| 5,880,731 A | 3/1999 | Liles et al. | |
| 5,956,038 A | 9/1999 | Rekimoto | |
| 6,041,316 A | 3/2000 | Allen | |
| 6,069,622 A * | 5/2000 | Kurlander | 715/753 |
| 6,147,692 A | 11/2000 | Shaw et al. | |
| 6,219,045 B1 | 4/2001 | Leahy et al. | |
| 6,268,872 B1 | 7/2001 | Matsuda et al. | |
| 6,307,568 B1 | 10/2001 | Rom | |

(Continued)

FOREIGN PATENT DOCUMENTS

WO    WO2006076385    7/2006

OTHER PUBLICATIONS

Giambruno, Mark, "3D Paper dolls Zygote Mix and Match Prebuilt Human Bodies", Jan. 1998, v 4 , n. 1, p. 56 (4 pgs).

(Continued)

*Primary Examiner* — Kimbinh T Nguyen
(74) *Attorney, Agent, or Firm* — Salter IP Law; Jim H. Salter

(57) ABSTRACT

A computer-implemented chat system having dual channel communications and self-defining product structures is disclosed. The system and method includes providing a first logical communication channel between a first chat client and a second chat client, the first logical channel conveying text chat messages between the first chat client and the second chat client; providing a second logical communication channel between the first chat client and the second chat client, the second logical channel conveying text chat command/control information between the first chat client and the second chat client; and using the chat command/control information to modify a 3D chat scene displayed on each of the first chat client and the second chat client systems.

20 Claims, 13 Drawing Sheets

U.S. PATENT DOCUMENTS

| | | |
|---|---|---|
| 6,320,583 B1 | 11/2001 | Shaw et al. |
| 6,453,294 B1 | 9/2002 | Dutta et al. |
| 6,522,333 B1 * | 2/2003 | Hatlelid et al. ............... 345/474 |
| 6,699,123 B2 * | 3/2004 | Matsuura et al. ............... 463/31 |
| 6,784,901 B1 | 8/2004 | Harvey et al. |
| 7,006,098 B2 | 2/2006 | Bickmore et al. |
| 7,065,711 B2 * | 6/2006 | Hata et al. ..................... 715/758 |
| 7,188,088 B2 | 3/2007 | Iwata et al. |
| 7,318,036 B2 | 1/2008 | Kim et al. |
| 7,912,793 B1 | 3/2011 | Danzig et al. |
| 2002/0099564 A1 | 7/2002 | Kim et al. |
| 2002/0169700 A1 | 11/2002 | Huffman et al. |
| 2003/0014423 A1 | 1/2003 | Chuah et al. |
| 2004/0179037 A1 * | 9/2004 | Blattner et al. ............... 345/751 |
| 2004/0179038 A1 * | 9/2004 | Blattner et al. ............... 345/751 |
| 2004/0179039 A1 * | 9/2004 | Blattner et al. ............... 345/758 |
| 2004/0221224 A1 * | 11/2004 | Blattner et al. ............ 715/500.1 |
| 2005/0137015 A1 * | 6/2005 | Rogers et al. ................... 463/42 |
| 2006/0031128 A1 | 2/2006 | Lamitie |
| 2007/0247979 A1 | 10/2007 | Brillon et al. |

OTHER PUBLICATIONS

Castronova, Edward, "The Price of 'Man' and 'Woman': A Hedonic Pricing Model of Avatar Attributes in a Synthetic World", Jun. 2003, CESIFO Working Paper No. 957, category 4: Labour Markets, 44 pgs.

\* cited by examiner

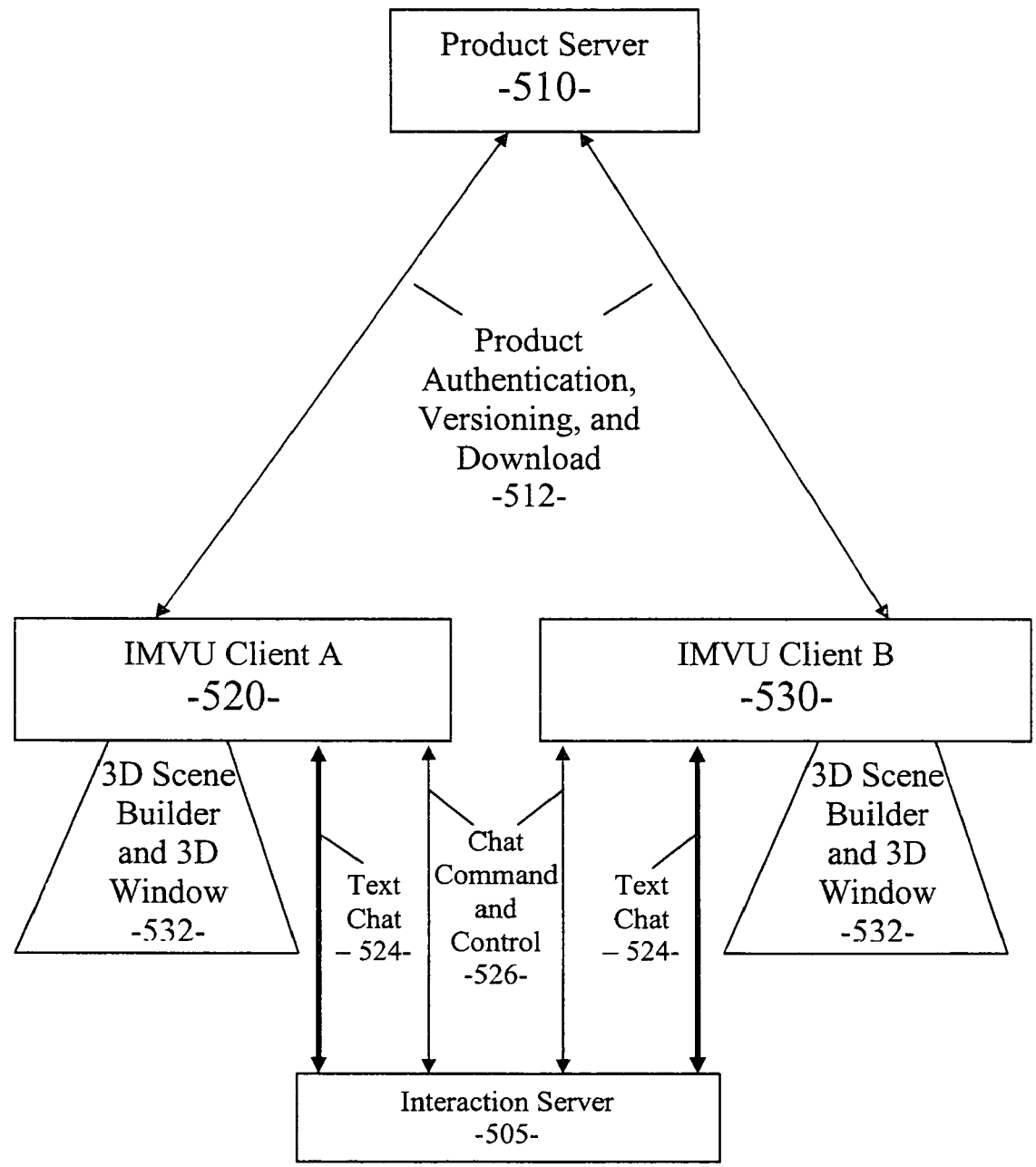
Figure 5. Communication Pathway Diagram

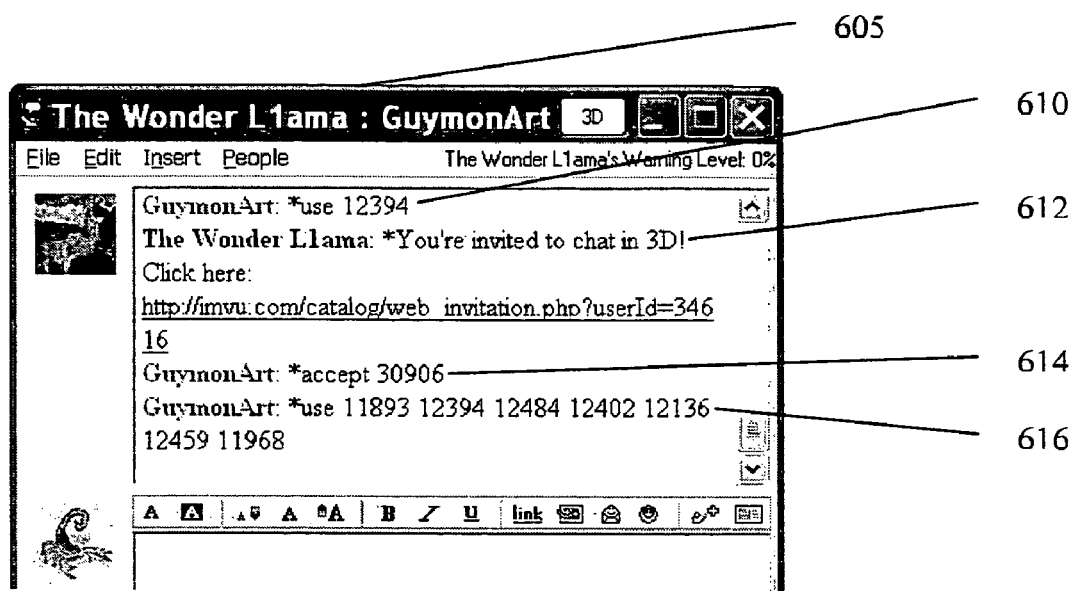
Figure 6. IMVU Session Start and Initial Product Loading

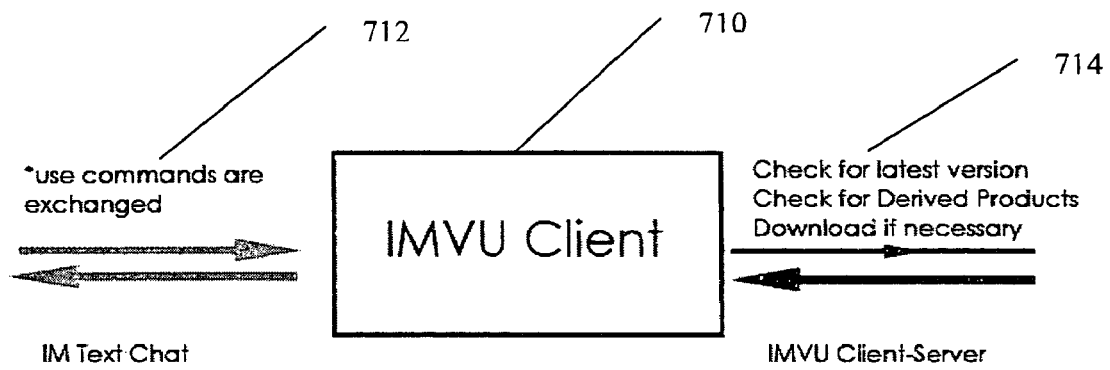
Figure 7. Product Usage Communication Pathway

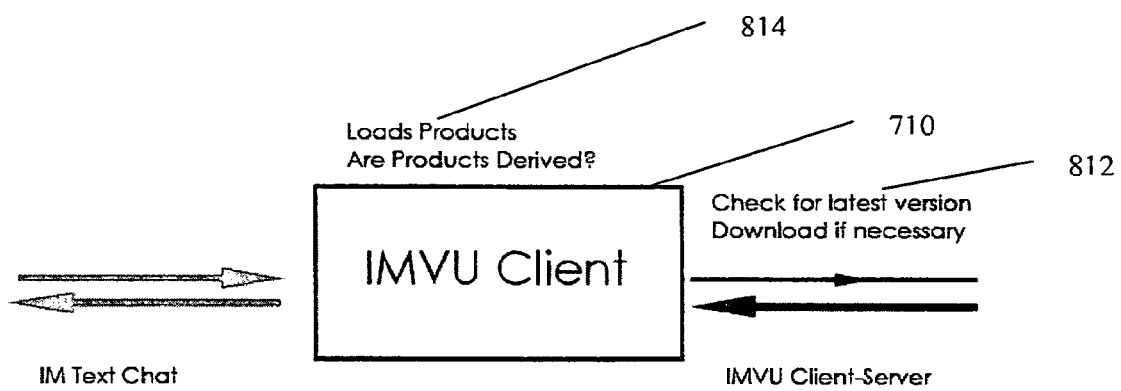
Figure 8. Derived Product Communication Loop

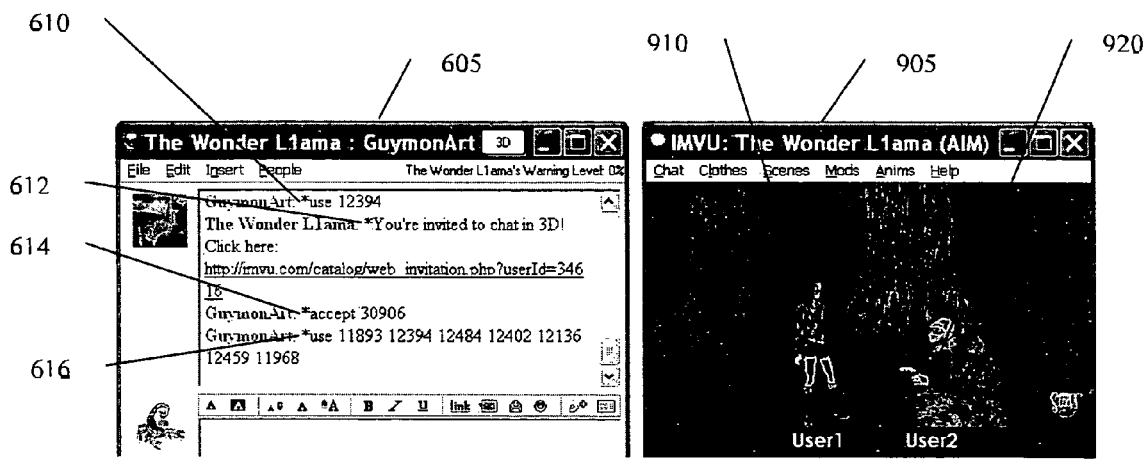
Figure 9. Products Displayed in 3D Window

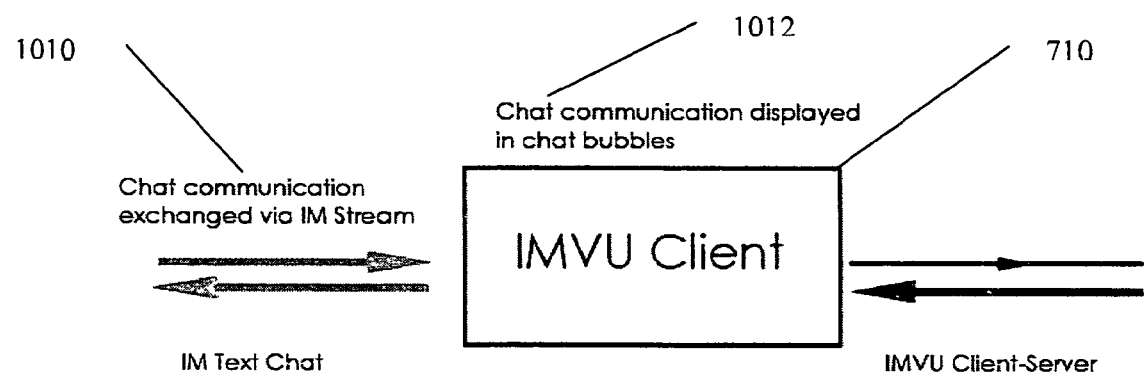
Figure 10. Simple Chat Communication Pathway

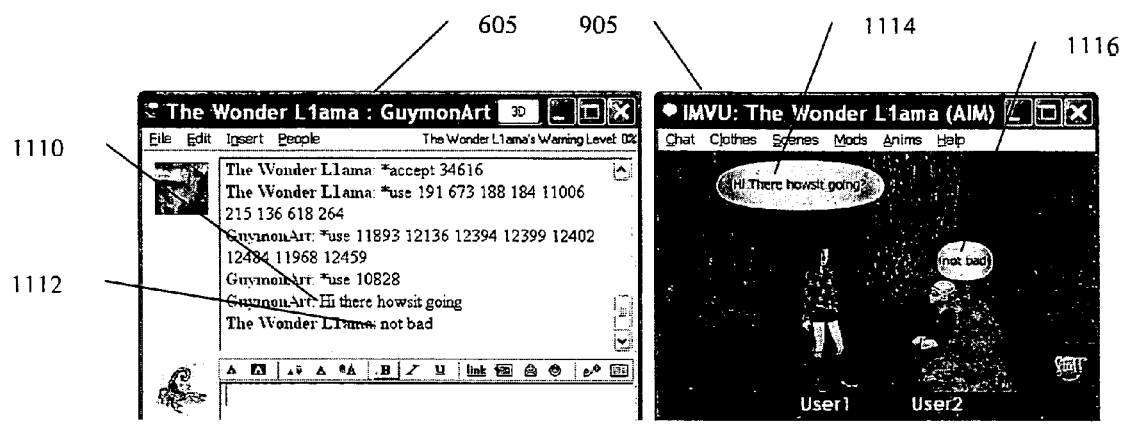
Figure 11. Simple Chat Communication Displayed

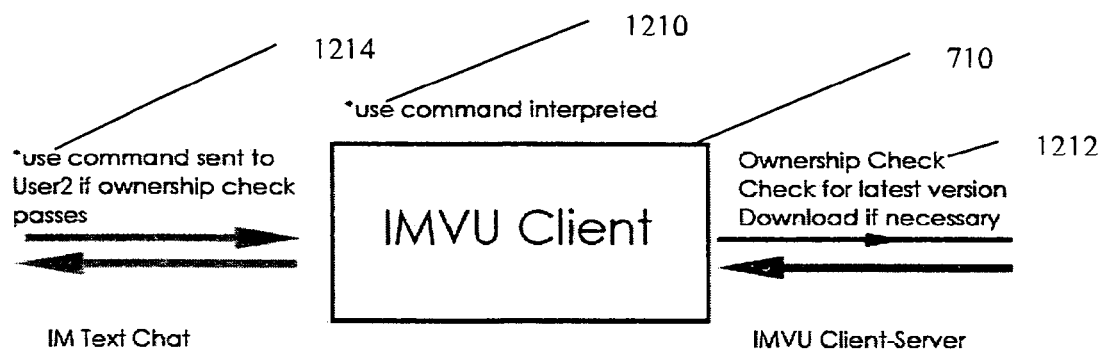
Figure 12. Product Usage Communication Pathway

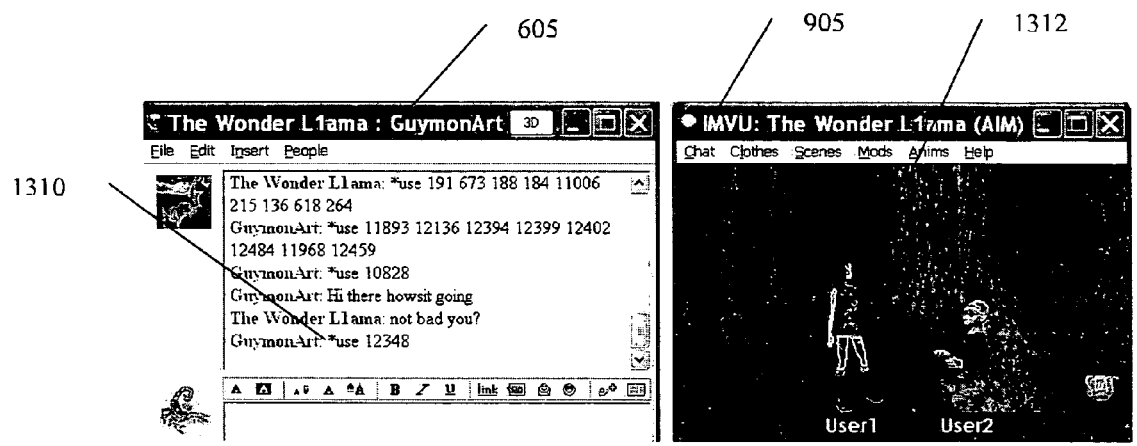
Figure 13. User1 Successfully Changes Clothing

COMPUTER-IMPLEMENTED CHAT SYSTEM HAVING DUAL CHANNEL COMMUNICATIONS AND SELF-DEFINING PRODUCT STRUCTURES

This is a continuation-in-part patent application of patent application Ser. Nos. 10/964,356 filed Oct. 12, 2004 now abandoned; and Ser. No. 11/035,926 filed Jan. 13, 2005 now U.S. Pat. No. 7,912,793; both assigned to the same assignee as the present patent application.

BACKGROUND

1. Field

Embodiments of the invention relate to the field of computer network applications and networked communications; and more specifically, to the field of chat or instant messaging communications via a computer network.

2. Related Art

The use of chat or instant messaging communications in a networked computer environment is well known. The America Online™ Instant Messaging system (AIM) is one well known system for controlling instant messaging in a networked environment. In these prior art systems, two computer users can communicate text messages in real time using an instant message (IM) client on their computers in concert with an IM server.

Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these systems do not represent the avatars as interacting in an environment.

U.S. Pat. No. 6,069,622 describes a comic generation system that controls the generation of comic panels. A comic panel is a graphical representation of an instance in time of a sequential course of events, such as a conversation between people. Each graphical representation typically includes a graphical representation of at least one character. The character has gestures that reflect a body pose and expressions that reflect a facial pose. Moreover, the character may have text associated with it (i.e., the character "speaks"), which is displayed in the comic panel within a bounded area called a "balloon." The comic generation system receives an interaction event and generates a comic panel. Examples of interaction events include text input by a user and selection of gestures and expressions by a user. When the interaction event provides text, the comic generation system automatically searches the text to identify any words or phrases that give rise to gestures and expressions for the character representing the user who provided the interaction event. Moreover, the comic generation system searches the text for trigger words that indicate alterations to the comic panel. The comic generation system generates the comic panel based on the results of its searches. The comic generation system also determines which characters to place in a comic panel, the positions of the characters, and the orientations of the characters. The comic generation system additionally determines the placement of balloons containing text.

However, the comic generation system described in the '622 patent is a static picture in a panel, as opposed to an animated character interacting with another avatar in the same scene. Given the static nature of the images in the '622 patent, the patent does not describe the use and interaction of avatars as 3-dimensional (3D) animated models. Further, although interaction events and user input can cause the modification of the character representing the user, the interaction events do not cause a character to transform into an entirely different character or object or cause the augmentation of the character into one with entirely new features.

U.S. Pat. No. 5,880,731 describes a system in which avatars representing participants in a graphic chat session are periodically animated to produce a gesture that conveys an emotion, action, or personality trait. Each participant in the chat session is enabled to select one of a plurality of different avatars to represent the participant in a graphic chat session. Associated with each avatar is a bitmap file that includes a plurality of frames illustrating the avatar in different poses, actions, and emotional states. Selected frames are displayed in rapid sequence in accord with a script file to create an animation effecting each gesture. The same script file is used to define a gesture for all of the avatars used in the chat session. A selected gesture can be transmitted with a text message to convey the user's emotional state. A gesture associated with the avatar is automatically displayed from time to time when the avatar is not otherwise gesturing or moving. The user can determine participants in the chat session with whom the user will interact, e.g., by defining a proximity radius around the user's avatar or by selecting the specific participants from a list. Avatars of participants that are outside the proximity radius (or otherwise not selected) and messages received from them are not displayed on the user's monitor.

The '731 patent specifically applies to avatars that are graphical bitmaps or sequences of bitmaps displayed according to a script. The '731 patent does not describe the use and interaction of avatars as 3-dimensional (3D) animated models. Further, although selected gestures can cause the modification of the character representing the user, the selected gestures do not cause a character to transform into an entirely different character or object or cause the augmentation of the character into one with entirely new features.

U.S. Pat. No. 6,522,333 describes a system and method for remote communication that allows communication over a network, but still provides a behavioral context within which the communication is interpreted. A visual representation of a user is provided to a recipient. A set of behavioral characteristics of the visual representation is provided to the user, the behavioral characteristics representing contexts within which data is to be interpreted. The user selects a behavioral characteristic and inputs data to be communicated to the recipient, along with any specific behavioral commands. Then, data is communicated to the recipient concurrently with a behavioral movement of the visual representation associated with the selected behavioral characteristic, wherein the behavioral movement provides context to the recipient for interpreting the communicated data. Behavioral characteristics include personality and mood intensity settings, and behavioral commands include gesture commands. The mood intensity selection allows the user to adjust which behavioral movements associated with the personality will be selected by assigning each movement a weight that determines the probability the movement will be selected. Gesture selection allows the user to punctuate text by having the visual representation act out a specific behavioral movement or sequence of movements to communicate an instantaneous emotion or behavior. Text is also analyzed to generate behavioral movements based on the content of the text.

Although user selected behavioral commands can cause the modification of the character representing the user, the selected behavioral commands do not cause a character to transform into an entirely different character or object or cause the augmentation of the character into one with entirely new features.

U.S. Pat. Nos. 6,320,583 and 6,147,692 describe methods and apparatuses to automate and confer additive properties to morphs (modification of a starting graphical image to a destination graphical image). The enhanced automated additive morphs created by this invention extend the currently limited scope of animation techniques, creating: moving morphs, where characters can speak, move, and emote during the morphing process; parametric character creation, where features can be sequentially added to a character to create a wide variety of resulting characters; behavioral transference, where character behavior can be automatically transferred to newly created characters, and behavioral layering whereby sequential behavior patterns can be concurrently transferred or imparted to a character. The patented inventions allow an animator to create, animate, control and transform two and three dimensional images instantaneously and fluidly. The invention provides a superior solution at significantly less cost which extends the range and properties of existing state of the art animation.

Again, although the technology described in the '583 and '692 patents can cause the modification of the character representing the user, the morphs and behavioral transference do not cause a character to transform into an entirely different character or object or cause the augmentation of the character into one with entirely new features. Further, the prior art systems do not provide an efficient means for communicating character and scene configurations and changes between IM users.

In the commercial marketplace of digital goods of today, wholesalers and retailers of digital goods still operate in the traditional model of physical goods. That is, wholesalers, intermediate wholesalers, and retailers still collaborate offline to create digital goods, which are then offered for sale and/or download via the network. Unfortunately, there is currently no system or method by which users can deploy digital goods directly in a direct product offering or a derived product offering and use/display these products seamlessly in a three-dimensional (3D) IM environment.

Thus, a computer-implemented chat system having dual channel communications and self-defining product structures is needed.

BRIEF DESCRIPTION OF THE DRAWINGS

The present invention is illustrated by way of example and not limitation in the figures of the accompanying drawings, in which

FIG. 5 illustrates a Communication Pathway Diagram.

FIG. 6 illustrates an IMVU Session Start and Initial Product Loading.

FIG. 7 illustrates a Product Usage Communication Pathway.

FIG. 8 illustrates a Derived Product Communication Loop.

FIG. 9 illustrates Products Displayed in a 3D Window.

FIG. 10 illustrates a Simple Chat Communication Pathway.

FIG. 11 illustrates Simple Chat Communication Displayed in a 3D Window with Chat Bubbles.

FIG. 12 illustrates a Product Usage Communication Pathway.

FIG. 13 illustrates a User Successfully Selecting and Displaying a Digital Product (e.g. Change of Clothing).

DETAILED DESCRIPTION

A computer-implemented chat system having dual channel communications and self-defining product structures is disclosed. In the following description, numerous specific details are set forth. However, it is understood that embodiments of the invention may be practiced without these specific details. In other instances, well-known processes, structures and techniques have not been shown in detail in order not to obscure the understanding of this description.

Figure 1:
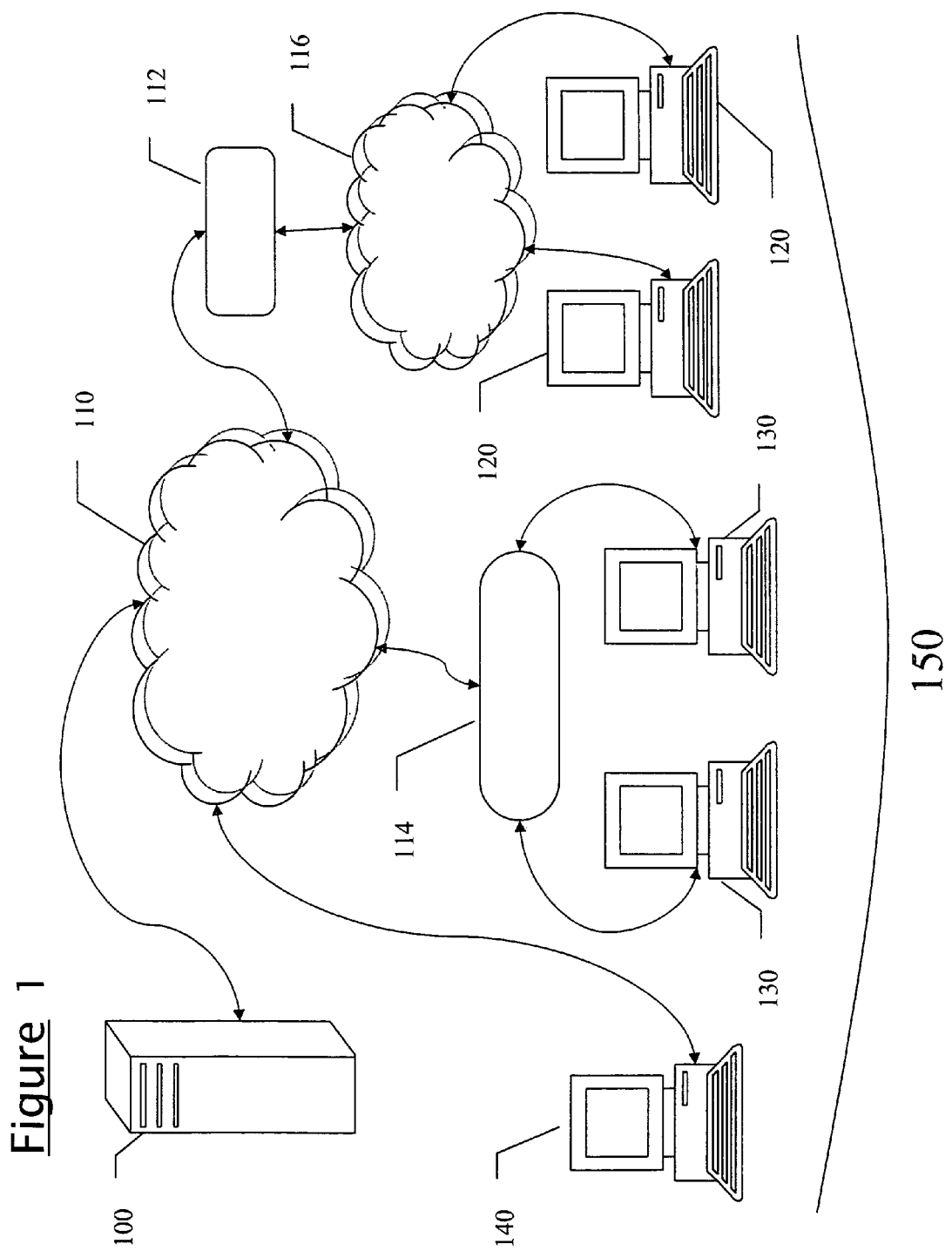
FIG. 1 is a block diagram of a network system on which the present invention may operate.

Referring now to FIG. 1, a diagram illustrates the network environment in which the present invention operates. In this conventional network architecture, a server computer system 100 is coupled to a wide-area network 110. Wide-area network 110 includes the Internet, or other proprietary networks, which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 connected through wide-area network 110 in various ways. For example, client 140 is connected directly to wide-area network 110 through direct or dial up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. In another alternative network topology, wide-area network 110 is connected to a gateway computer 112. Gateway computer 112 is used to route data to clients 120 through a local area network (LAN) 116. In this manner, clients 120 can communicate with each other through local area network 116 or with server 100 through gateway 112 and wide-area network 110.

Using one of a variety of network connection means, server computer 100 can communicate with client computers 150 using conventional means. In a particular implementation of this network configuration, a server computer 100 may operate as a web server if the Internet's World-Wide Web (WWW) is used for wide area network 110. Using the HTTP protocol and the HTML coding language across wide-area network 110, web server 100 may communicate across the World-Wide Web with clients 150. In this configuration, clients 150 use a client application program known as a web browser such as the INTERNET EXPLORER™ published by MICROSOFT Corporation of Redmond, Wash., the user interface of AMERICA ON-LINE, or the web browser or HTML translator of any other well-known supplier. Using such conventional browsers and the World-Wide Web, clients 150 may access image, graphical, and textual data provided by web server 100 or they may run Web application software. Conventional means exist by which clients 150 may supply information to web server 100 through the World-Wide Web 110 and the web server 100 may return processed data to clients 150.

Figure 2A:
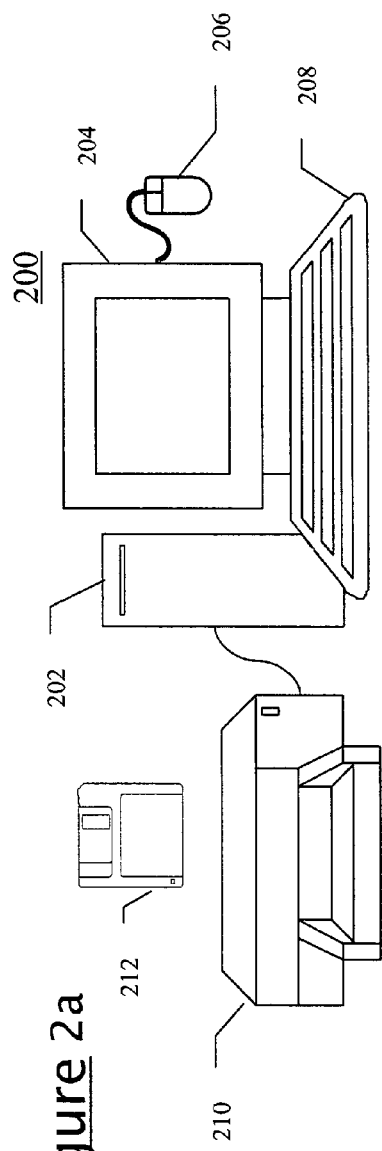
FIGS. 2a and 2b are a block diagram of a computer system on which the present invention may operate.
Figure 2B:
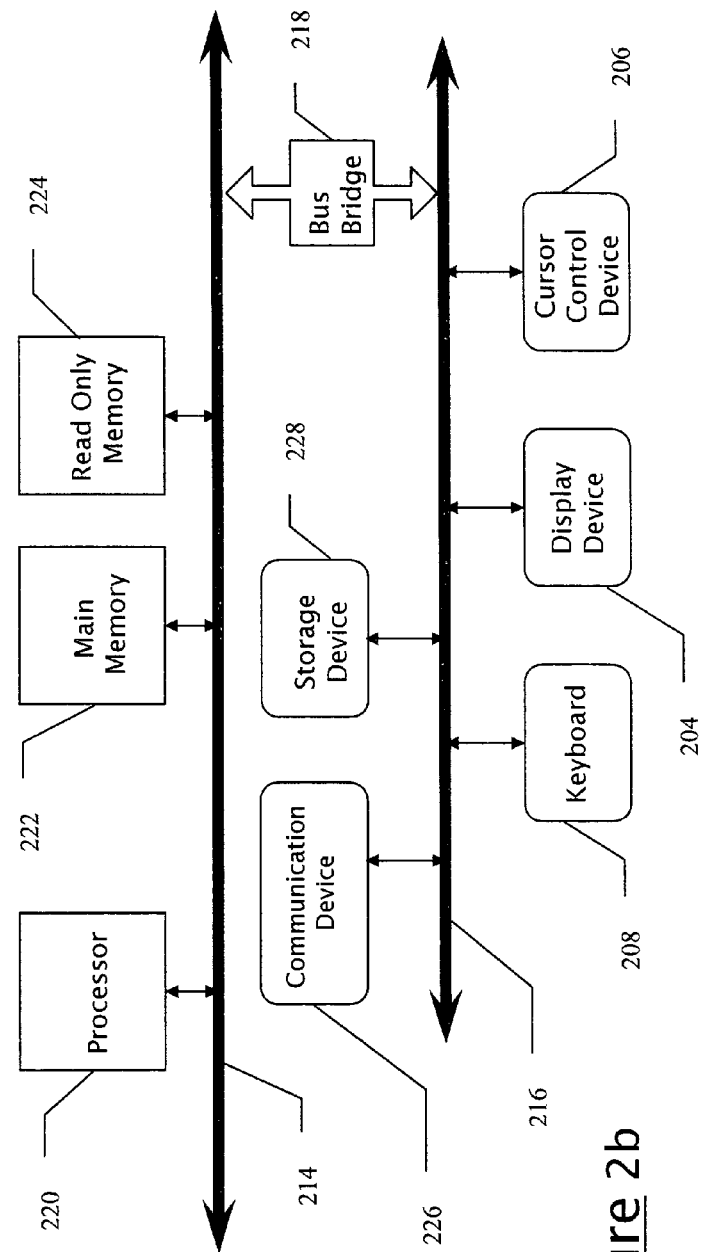

Having briefly described one embodiment of the network environment in which the present invention may operate, FIGS. 2a and 2b show an example of a computer system 200 illustrating an exemplary client 150 or server 100 computer system in which the features of the present invention may be implemented. Computer system 200 is comprised of a bus or other communications means 214,216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 150 can be implemented as a network computer or thin client device. Client 150 may also be a laptop or palm-top computing device, such as the PALM PILOT™. Client 150 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as web server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The system of the present invention includes software, information processing hardware, and various processing steps, which will be described below. The features and process steps of the present invention may be embodied in machine or computer executable instructions. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

The present invention is a computer-implemented chat system having dual channel communications and self-defining product structures. In one embodiment, avatars represent one example of a digital product that can be self-defining, augmented, modified, improved, derived, or otherwise changed through a hierarchy of product developers, each of whom add some value to the component parts that are ultimately sold as a derived digital product.

The avatars of one embodiment of the present invention are built on conventional animated three-dimensional (3D) mathematical models using techniques well known to those of ordinary skill in the art. Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these systems do not represent the avatars as interacting in an environment.

Figure 3:
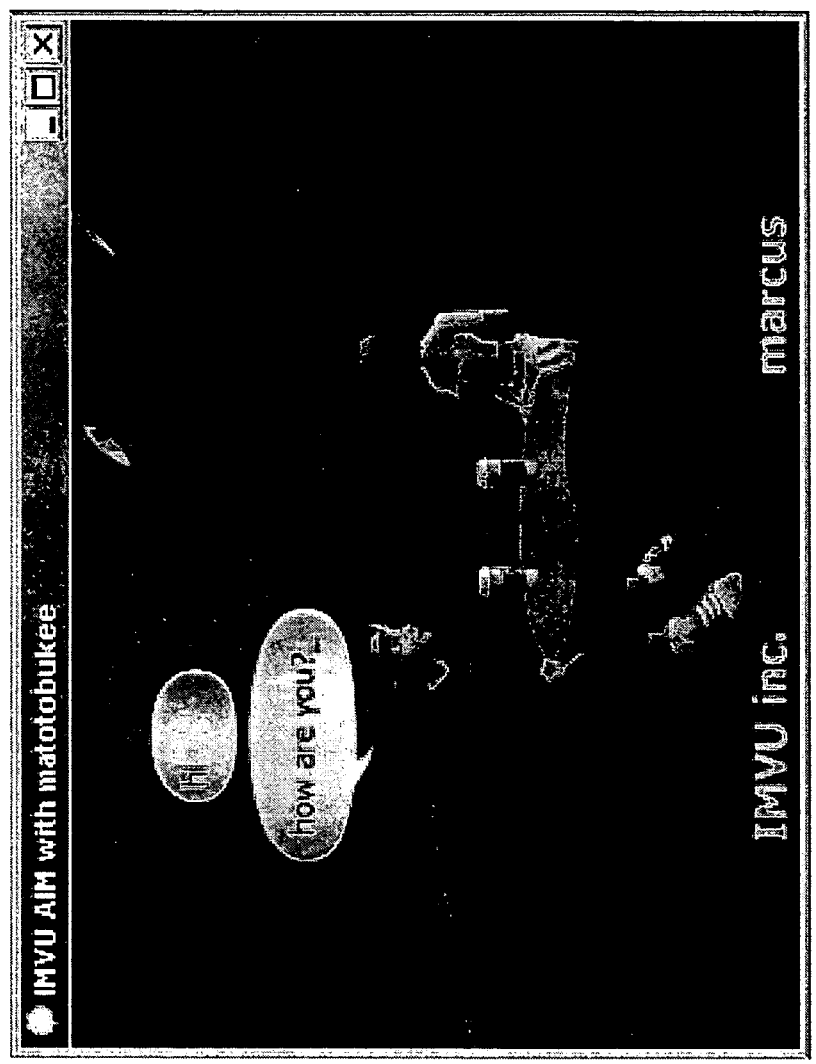
FIG. 3 illustrates an example of a shared virtual scene in which two avatars interact with each other as users represented by the avatars converse in an instant message communication environment.

The present invention improves on the prior art by placing these 3D avatars in virtual environments and enabling interaction between the avatars in a shared virtual scene. The behavior of the 3D avatars is related to the interaction between the computer users being represented by the avatars. In one embodiment, the avatars represent users in an instant messaging (IM) conversation supported by conventional network-based IM infrastructure. As the users type in dialog in a conventional IM application program, the dialog is displayed in the shared virtual scene as dialog bubbles adjacent to the avatar representing the speaker. FIG. 3 illustrates such a shared virtual scene in which two avatars are shown with associated dialog bubbles corresponding to the conversation taking place between IM users being represented by the avatars.

In the example of FIG. 3, each of the avatars in the virtual scene can represent a digital good or a digital product that can be offered for sale to a consumer. In particular, each avatar can represent a derived digital product that comprises a combination of component digital parts. For example, an avatar can include representations of various apparel and/or jewelry along with accessories. In the example of FIG. 3, one avatar is shown with a blue shirt and green shoes with a beverage cup on the table. This avatar can thus be considered a derived digital product with the blue shirt, the green shoes, and the beverage cup being digital component parts that can be purchased separately by a consumer. In this example, a consumer could be allowed to "dress" his/her avatar by purchasing component digital attire (i.e. digital component parts). The various available digital component parts can be provided by different digital wholesalers in a derived product hierarchy. In the description that follows, the system and method of the present invention to enable the authentication, versioning, downloading, and self-assembly of the digital products in an interactive 3D chat environment is fully disclosed.

Figure 4:
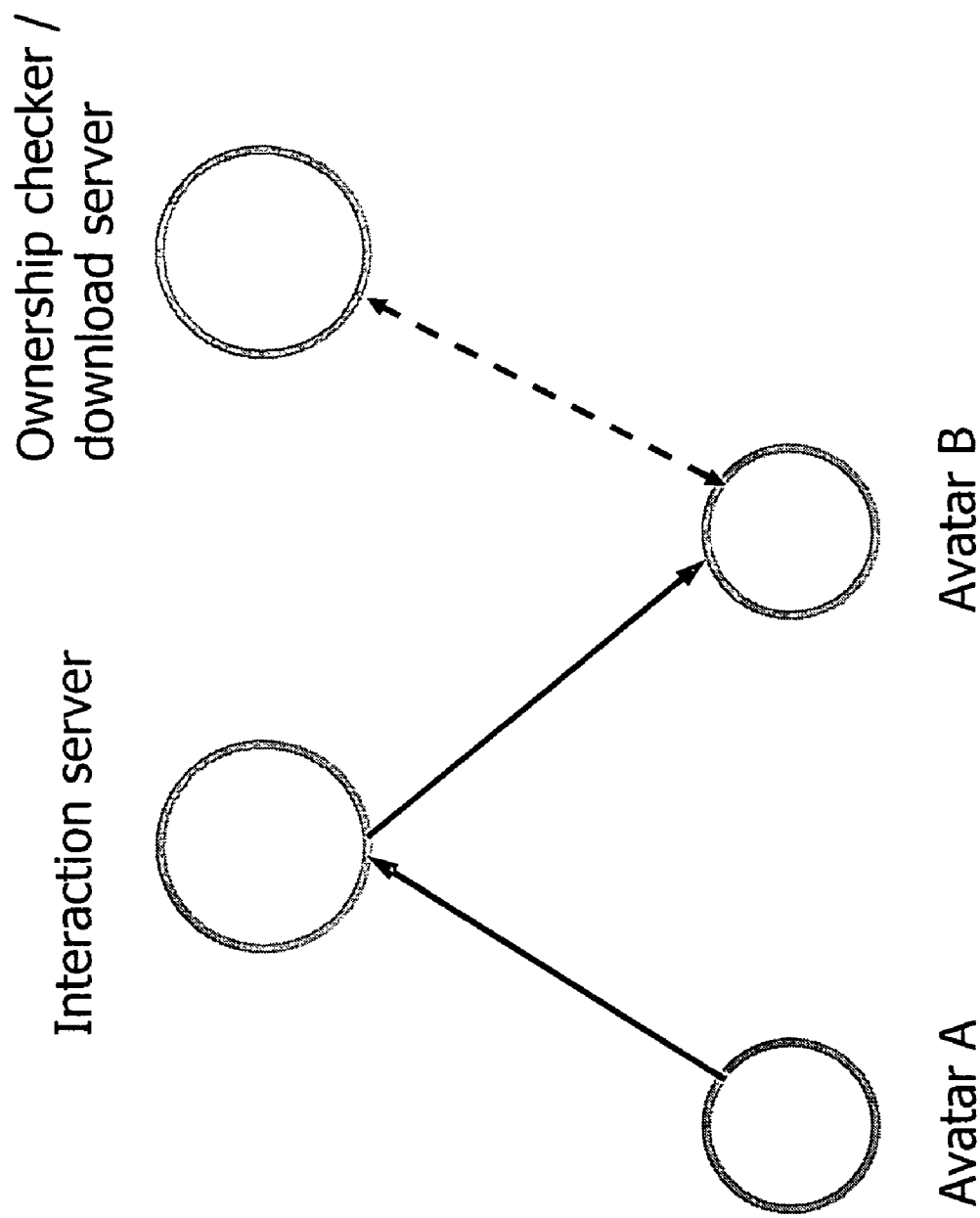
FIG. 4 illustrates a typical network architecture used in one embodiment.

Referring to FIG. 4, a diagram illustrates a typical network architecture used in one embodiment. In this embodiment, an interaction server is used to enable interaction and/or communication between two networked computer users represented by avatars (i.e. Avatar A and Avatar B). As described above, one application of the avatar embodiment of the present invention is an IM application. In the diagram of FIG. 4, the conventional IM server/provider is represented as the interaction server. In this case, the interaction server facilitates IM communications between the users associated with Avatar A and Avatar B.

Because the product model of the present invention relies upon the purchase and ownership of a particular avatar (i.e. digital product) by a particular user, it is necessary to determine at various stages of the IM communication whether a particular user is a legitimate owner (or licensee) of a selected avatar. For this reason, one embodiment uses the ownership checker server to validate that a specific user has acquired the rights to use a particular avatar or a particular digital product. If this ownership validation becomes necessary during an IM communication session, for example, the end user client system can initiate a communication with the ownership checker server to validate ownership of a particular digital product. If ownership is validated or a purchase transaction is completed, the ownership checker server enables the use of the particular digital product.

As an example of an ownership checking transaction, the user represented by Avatar B (shown in FIG. 4) may be in conventional IM communication with the user represented by Avatar A. During this IM session, Avatar B's user may wish to select or purchase a new pair of (digitally represented) shoes for his/her avatar (Avatar B). During this selection process, Avatar B's user is presented with various (digitally represented) shoe selections. Upon selection of a particular digital product (i.e. a digitally represented pair of shoes), the client system of Avatar B's user initiates a request to the ownership checker server to determine if Avatar B's user had previously purchased the selected digital product. If not, a purchase transaction may be initiated with the ownership checker server or another sales server in a different embodiment. Once the purchase transaction is complete, the ownership checker server validates Avatar B's user's property rights in the selected digital product and the selected (digitally represented) pair of shoes is displayed on Avatar B.

Referring to FIG. 5, a diagram illustrates another embodiment of a network architecture used with the present invention. In this embodiment, an interaction server 505 is used to enable interaction and/or communication between two networked computer users represented by avatars (i.e. Avatar A and Avatar B) being generated on corresponding IM client computer system A 520 and corresponding IM client computer system B 530. As described above, one application of the avatar embodiment of the present invention is an IM application. In the diagram of FIG. 5, the conventional IM server/provider 505 (e.g. AIM) is represented as the interaction server communicating in well-known ways via text chat with clients 520 and 530 on communication channels 524. In this case, the interaction server 505 facilitates IM communications between the users associated with Avatar A (IM client computer system A 520) and Avatar B (IM client computer system B 530).

Although the present invention can employ the conventional text chat infrastructure of interaction server 505, the present invention augments the IM client software on client systems 520 and 530 to add a second logical channel for the transfer of chat command and control information 526 between interaction server 505 and client systems 520 and 530. The chat command and control channel 526 operates in parallel with first logical channel (i.e. conventional text chat) 524 to convey chat messages and chat control information between client 520 and client 530. In one embodiment, the second logical channel 526 can be implemented by inserting special predefined text characters into the text stream that would normally travel between clients 520 and 530. In the examples of the present invention illustrated below, an asterisk "*" symbol is used to signal the start of a chat command. It will be apparent to those of ordinary skill in the art upon reading this specification that other equivalent means can be used to implement a second logical channel or a side channel operating in parallel with a conventional text chat interaction server. In normal operation, clients 520 and 530 capture and interpret an incoming IM text stream. When necessary, as will be described in more detail below, the client 520 or 530 also may insert command and control text into the outgoing IM text stream thereby creating the second logical channel 526. In one embodiment, this control text is denoted with an asterisk (*) prefix. These are called 'star commands'.

Referring still to FIG. 5, because the product model of the present invention relies upon the purchase and ownership of a particular avatar (i.e. digital product) by a particular user, it is necessary to determine at various stages of the IM communication whether a particular user is a legitimate owner (or licensee) of a selected avatar. For this reason, one embodiment uses the product server 510 to validate that a specific user has acquired the rights to use a particular avatar (i.e. a particular digital product) or a portion thereof. If this ownership validation or authentication becomes necessary during an IM communication session, for example, the end user client system (e.g. IM client computer system A 520 or IM client computer system B 530) can initiate a communication with the product server 510 on communication channels 512 to validate ownership of a particular digital product. If ownership is validated or a purchase transaction is completed, the product server 510 enables the use of the particular digital product. In a similar fashion, the product server 510 can be used by IM client computer system A 520 or IM client computer system B 530 to validate that the most recent version of a desired digital product or a digital part is available. Once the authentication and versioning of a desired digital product or a digital part is completed, the IM client computer system A 520 or IM client computer system B 530 can initiate the download of the desired digital product or digital part. Conventional peer-to-peer networks can also be used to download digital goods thereby lightening the processing load on product server 510. Once the downloaded digital product or digital part is resident in the client computer system, the resident digital product or digital part can be re-used by the client user until the license for the product expires or the product becomes out-dated by the presence of a more recent version of the product on product server 510. In some examples of the present invention presented below, the product server 510 may be denoted the IMVU server.

As an example of an ownership checking transaction, the user operating IM client computer system A 520 (represented by Avatar A) may be in conventional IM communication with the user operating IM client computer system B 530 (represented by Avatar B). During this IM session, Avatar B's user may wish to select or purchase a new pair of (digitally represented) shoes for his/her avatar (Avatar B). During this selection process, Avatar B's user is presented with various (digitally represented) shoe selections. Upon selection of a particular digital product (i.e. a digitally represented pair of shoes), the client system 530 of Avatar B's user initiates a request to the product server 510 to determine if Avatar B's user had previously purchased the selected digital product. If not, a purchase transaction may be initiated with the product server 510 or another sales server in a different embodiment. Once the purchase transaction is complete, the product server 510 validates Avatar B's user's property rights in the selected digital product and the selected (digitally represented) pair of shoes is displayed on Avatar B.

The avatars of the present invention are built on conventional animated three-dimensional (3D) mathematical models using well-known techniques. Existing systems have found the use of avatars beneficial for improved communication. Conventional avatars are 2D or 3D graphic images that can be used to represent a human individual. Many systems have improved the animation of the avatar images so the images in animation can represent various facial expressions and generally appear reasonably lifelike. Other conventional systems use avatars to represent a user while he/she is chatting with one or more other users. However, these prior art systems do not represent the avatars as interacting in a shared environment.

The present invention improves on the conventional technology by placing these 3D avatars in virtual environments and enabling interaction between the avatars in a shared virtual scene 532. The behavior of the 3D avatars is related to the interaction between the computer users being represented by the avatars. In one implementation, the avatars represent users in an instant messaging (IM) conversation supported by conventional network-based IM infrastructure. As the users type in dialog in a conventional IM application program, the dialog is rendered by a 3D scene builder (shown in FIG. 5) and displayed in the shared virtual scene (3D window) 532 as dialog bubbles adjacent to the avatar representing the speaker. The avatar positioning and gesturing conveys an interaction between the virtual characters that corresponds to the interaction between the physical users.

The 3D scene builder and 3D window 532 of one embodiment integrates visual effects, product files and text chat into a coherent 3D scene. Except for the 2D graphical user interface (GUI) and overlays, the 3D scene is entirely composed of digital product patterns (i.e. Body Patterns) and their component digital product parts (i.e. Body Parts). The Body Patterns, Body Parts, and the data files they refer to are stored in Product Files.

In one embodiment, Body Patterns include: 1) Blueprint files (written in simple XML format), which are used to describe the structure of an object; 2) an indexed list of Body Parts; and 3) the asset names (3D, 2D, sound, etc.) used by each Body Part.

In one embodiment, Body Parts are the individual components of a Body Pattern. Body Parts have a proper name and an ID, defined in the Body Pattern.

In one embodiment, Product Files are compressed data files containing assets (3D data, 2D images, sound, animation, etc.), metadata (Body Pattern and Body Part information), and derivation information (product parentage). A single Product File may only refer to a single Body Pattern. However, a single Product File may include data for multiple Body Parts.

Using the data constructs described above, digital products and parts can be conveniently defined and their interconnection and interoperation can be self defining. Each Product File contains both the building materials (2D & 3D assets, sounds, animation, etc.) and the instructions for assembly (Body Patterns, Body Part definitions, etc.). Also, since a given product may require one or more other products to be present in order for it to function, Product Files also store information about which other products need to be loaded. Therefore, a Product File contains all the information required by the 3D Scene Builder 532, including references to other product files from which a desired product may be derived. In this fashion, a hierarchical product definition is enabled.

The 3D scene builder 532 uses the chat command and control channel 526 as described above to receive a request for a particular identified product or part as encoded in 'star commands' which are interpreted by the 3D Scene Builder 532. The 3D Scene Builder 532 uses the products identified from channel 526 to obtain a corresponding Product File. If necessary, Product File download can be effected on channel 512 from product server 510. The Product file can then be used to render the desired product into the 3D scene displayed in the 3D window 532.

The 3D scene builder 532, manifested by the 3D window, 'manufactures' a 3D scene by displaying one or more 'products' as specified and identified by default configuration parameters and by explicit selection by IM users in star commands during a chat session. The 3D scene builder 532 takes the materials and instructions from the selected/identified Product Files, and assembles a 3D scene. The 3D scene builder 532 is data-driven; it comprises a set of libraries and software application programs for displaying 2D and 3D content; but, 3D scene builder 532 contains no scene-specific information. The key concept here is that the 3D scene builder 532 is a powerful but data-barren construct.

Using the structures described above, the present invention enables a chat system having dual channel communications and self-defining product structures. In the examples presented below, these structures are used to support the various features of the present invention.

FIG. 6 illustrates an IMVU Session Start and Initial Product Loading. Using well-known techniques, a text chat window 605 is displayed with the dialog between two IM users displayed as text strings. In this example, a first user (GuymonArt, User 1) is chatting with a second user (The Wonder Llama, User 2). In this example, text chat is sent via the IM. Authentication, versioning and product file download happen via the IMVU Client-Product Server Stream 512. Arbitrarily, User1 begins the chat and User2 responds. Initially, User 1 sends a star command, "*use 12394" to the IMVU client 710 as shown by the text string 610 illustrated in FIG. 6. The star command 610 is sent on the second logical channel 526 as described above. The command 610 identifies a product by its unique number. The unique product number corresponds to a product file that contains information about the product as also described above. In this manner, User1 and User2 IMVU Clients exchange star commands to describe the initial configuration for their respective avatar products (See FIG. 6, '*use 11893 12394 12484 . . . etc.') and for the 3D room in which the avatars will be displayed. Also as shown in FIG. 6, User1 invites User2 into a 3D chat session by sending a star command (*You're Invited) 612 on the second logical channel 526. User2 IMVU Client responds with another star command (*accept) 614 to acknowledge the invitation from User1.

FIG. 7 illustrates a Product Usage Communication Pathway. As User1 and User2 IMVU Clients exchange star commands to describe the initial configuration for their respective avatar products (See FIG. 6, '*use 11893 12394 12484 . . . etc.') and to specify new avatar products (e.g. avatar clothing), the specified products are validated and obtained through a communication with Product Server 510. In this communication, User1 and User2 IMVU Clients query the Product Server 510 to verify that the latest version of each product file is present on the user's machine. If the product file is not resident on the user's machine, the product file is downloaded from the Product Server 510 (See FIG. 7). User1 and User2 also validate that the latest version of the specified products are resident on the user's machine.

FIG. 8 illustrates a Derived Product Communication Loop. As each product file is loaded into the requesting user's machine, the product file includes information that informs the IMVU Client whether the product is a derived product. For each derived product, the Product Server 510 validation-download cycle is repeated 814. See FIG. 8, i.e., does the latest version exist 812, if not fetch the latest version from the product server 510. Is the product a derived product 814, if so fetch the component parts of the derived product in the same manner as the product itself is fetched.

FIG. 9 illustrates Products Displayed in 3D Window. The Scene Builder 532 deploys the data contained in the accumulated product files to create a 3D scene 905. As shown in FIG. 9, the text chat window 605 is shown as in previous examples with the star command lines 610 and 616 (i.e. '*use 11893 12394 12484 . . .' etc.). These "*use" commands specify the unique identity of avatar products that are displayed in 3D scene window 905. For example, the *use commands 610 and 616 are initiated by User1 to depict the avatar 910 corresponding to User1 in 3D scene 905 as wearing particular clothing. The particular clothing corresponds to the avatar products specified by User1 in the *use commands 610 and 616. In this manner, User1 has the ability to "dress" his/her avatar is a desired way. Similarly, User2 can use star commands to "dress" his/her avatar 920 in a desired way.

FIG. 10 illustrates a Simple Chat Communication Pathway. Once the users in an IM chat session use the second logical channel commands 526 as described above to initiate a 3D scene and to "dress" their avatars in a desired fashion, the usual chat session can begin. Simple text chat communication is exchanged between User1 and User2 (FIG. 10 at 1010). Text chat on a first logical channel 524 is interpreted as simple chat and displayed as chat bubbles in the 3D scene 905 (FIG. 10 at 1012).

FIG. 11 illustrates a Simple Chat Communication Displayed in the 3D scene as chat bubbles. For example, the chat text input by User1 at chat stream 1110 is interpreted by IMVU client 710 and displayed in 3D scene 905 as chat bubble 1114. Similarly, the chat text input by User2 at chat stream 1112 is interpreted by IMVU client 710 and displayed in 3D scene 905 as chat bubble 1116.

Referring now to FIGS. 12 and 13, an example of one embodiment illustrates how a user (User1 in this case) can employ star commands (i.e. the second logical channel commands 526) to modify the appearance of the avatar representing the user (User1 in this case) in the 3D scene 905.

FIG. 12 illustrates a Product Usage Communication Pathway. In step 1210, the IMVU client 710 interprets a "*use" command that specifies the selection of a particular avatar product. In this case, the User1 has entered a star command (see FIG. 13, command 1310) that specifies the selection of a particular avatar product that corresponds to a different set of clothing for the avatar 1312 corresponding to User1. In step 1212 shown in FIG. 12, the avatar product selected by User1 is validated in a communication between IMVU client 710 and product server 510. The ownership of the selected product is checked and the latest version information is obtained. If the selected product is not resident on the User1 computer system, the selected product is downloaded from product server 510 in step 1212. In step 1214, the *use command is sent to User2 if the ownership check passes. As a result, the new clothing corresponding to the selected and validated product specified by User1 is displayed on avatar 1312 in 3D scene window 905.

FIG. 13 illustrates a User Successfully Selecting and Displaying a Digital Product (e.g. Change of Clothing). User1 changes clothes by typing a star command 1310 into the IM text window 605. This star command triggers the following events.

User1's IMVU client 710 interprets the star command (step 1210) and executes an ownership validation check via a communication 1212 with product server 510. In essence, the IMVU client 710 asks the product server 510, "does User1 own the specified product?" If 'yes', a version check is executed (step 1212), and the latest version, as well as any required products from which it is derived, are downloaded, as described above. Products are loaded into 3D Window 905 (see FIG. 13). In addition, the *use star command is sent to User2. User2's IMVU Client 710 also executes a version check, and downloads products as necessary. These User2 products are also loaded into 3D Window 905 (see FIG. 13). If User1 does not own the specified product, no products are downloaded, and no star commands are sent to User2. In this manner, IM users can use the present invention to modify the look of their avatars and the 3D environment in 3D window 905.

Thus, a computer-implemented chat system having dual channel communications and self-defining product structures is disclosed. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

We claim:

1. A method, comprising:
providing a first logical communication channel between a first chat client and a second chat client, the first logical channel conveying text chat messages between the first chat client and the second chat client;
providing a second logical communication channel between the first chat client and the second chat client, the second logical channel conveying text chat command/control information between the first chat client and the second chat client, the chat command/control information including special predefined text characters inserted into a text stream transferred in a common instant messaging (IM) text stream with the first logical communication channel;
using a processor and the chat command/control information to modify a 3D chat scene displayed on each of the first chat client and the second chat client systems; and
using the chat command/control information to identify a digital product for retrieval, the digital product being derived from one or more other digital products in a hierarchical product definition, at least one of the one or more other digital products being derived from a different one of the one or more other digital products, the one or more other digital products being separately identifiable as digital products for retrieval using chat command/control information, the derived digital products inheriting characteristics of ancestor digital products from which the derived digital products are derived, the derived digital products inheriting revenue values from the ancestor digital products, a value of a derived digital product corresponding to a combined value of the inherited revenue values associated with the ancestor digital products from which the derived digital product is derived.

2. The method as claimed in claim 1 further including a third communication channel, the third communication channel providing a communication link between the first chat client and a digital product server, the third communication channel also providing a communication link between the second chat client and the digital product server.

3. The method as claimed in claim 2 wherein the chat command/control information includes digital product identifying information inserted into a text stream transferred in the common instant messaging (IM) text stream with the first logical communication channel, the method further including:
   extracting the digital product identifying information from the chat command/control information on the second logical communication channel; and
   using the digital product identifying information to obtain corresponding digital product information from the digital product server.

4. The method as claimed in claim 2 wherein the chat command/control information includes digital product identifying information inserted into a text stream transferred in the common instant messaging (IM) text stream with the first logical communication channel, the method further including:
   extracting the digital product identifying information from the chat command/control information on the second logical communication channel; and
   using the digital product identifying information to validate ownership of a corresponding digital product in a validation transaction between a chat client and the digital product server.

5. The method as claimed in claim 1 further including:
   downloading the digital product.

6. The method as claimed in claim 5 further including:
   rendering the downloaded digital product in the 3D chat scene.

7. The method as claimed in claim 4 further including:
   retaining the downloaded digital product in a local memory of the client system.

8. A method comprising:
   providing a communication channel between a chat client and a digital product server;
   providing a first logical communication channel between a first chat client and a second chat client, the first logical channel conveying text chat messages between the first chat client and the second chat client;
   providing a second logical communication channel between the first chat client and the second chat client, the second logical channel conveying text chat command/control information between the first chat client and the second chat client, the chat command/control information including special predefined text characters inserted into a text stream transferred in a common instant messaging (IM) text stream with the first logical communication channel;
   using a processor to extract digital product identifying information from the chat command/control information on the second logical communication channel; and
   using the digital product identifying information to obtain a corresponding digital product file from the digital product server, the digital product file including digital product pattern information and digital product parts information to define a digital product, the digital product being derived from one or more other digital products in a hierarchical product definition, at least one of the one or more other digital products being derived from a different one of the one or more other digital products, the one or more other digital products being separately identifiable as digital products for retrieval using chat command/control information, the derived digital products inheriting characteristics of ancestor digital products from which the derived digital products are derived, the derived digital products inheriting revenue values from the ancestor digital products, a value of a derived digital product corresponding to a combined value of the inherited revenue values associated with the ancestor digital products from which the derived digital product is derived.

9. The method as claimed in claim 8 wherein the digital product pattern information defines the structure of the digital product and the digital product parts information defines the component parts of the digital product.

10. The method as claimed in claim 8 wherein the digital product file includes instructions for assembly of the digital product.

11. The method as claimed in claim 8 further including integrating visual effects and text chat with the digital product in the 3D chat scene.

12. The method as claimed in claim 8 further including:
    extracting text chat messages from the first logical communication channel.

13. The method as claimed in claim 8 further including:
    using information in the digital product file to obtain a derived product file from the digital product server.

14. The method as claimed in claim 8 further including:
    rendering textured chat messages in a 3D chat scene along with the digital product.

15. The method as claimed in claim 8 wherein the digital product is an avatar.

16. The method as claimed in claim 8 wherein the digital product is a component part of an avatar.

17. An apparatus, comprising:
    a communication device to provide a first logical communication channel between a first chat client and a second chat client, the first logical channel conveying text chat messages between the first chat client and the second chat client, the communication device further to provide a second logical communication channel between the first chat client and the second chat client, the second logical channel conveying text chat command/control information between the first chat client and the second chat client, the chat command/control information including special predefined text characters inserted into a text stream transferred in a common instant messaging (IM) text stream with the first logical communication channel; and
    a 3D chat scene generator to use the chat command/control information to modify a 3D chat scene displayed on each of the first chat client and the second chat client systems, the 3D chat scene generator to use the chat command/control information to identify a digital product for retrieval, the digital product being derived from one or more other digital products in a hierarchical product definition, at least one of the one or more other digital products being derived from a different one of the one or more other digital products, the one or more other digital products being separately identifiable as digital products for retrieval using chat command/control information, the derived digital products inheriting characteristics of ancestor digital products from which the derived digital products are derived, the derived digital products inheriting revenue values from the ancestor digital products, a value of a derived digital product corresponding to a combined value of the inherited revenue values associated with the ancestor digital products from which the derived digital product is derived.

18. The apparatus as claimed in claim 17 wherein the chat command/control information includes digital product identifying information inserted into the text stream transferred in the common instant messaging (IM) text stream with the first logical communication channel.

19. An apparatus, comprising:
a communication device to provide a first logical communication channel between a first chat client and a second chat client, the first logical channel conveying text chat messages between the first chat client and the second chat client, the communication device further to provide a second logical communication channel between the first chat client and the second chat client, the second logical channel conveying text chat command/control information between the first chat client and the second chat client, the chat command/control information including special predefined text characters inserted into a text stream transferred in a common instant messaging (IM) text stream with the first logical communication channel; and
a digital product processor to extract digital product identifying information from the chat command/control information on the second logical communication channel, and to use the digital product identifying information to obtain a corresponding digital product file from a digital product server, the digital product file including digital product pattern information and digital product parts information to define a digital product, the digital product being derived from one or more other digital products in a hierarchical product definition, at least one of the one or more other digital products being derived from a different one of the one or more other digital products, the one or more other digital products being separately identifiable as digital products for retrieval using chat command/control information, the derived digital products inheriting characteristics of ancestor digital products from which the derived digital products are derived, the derived digital products inheriting revenue values from the ancestor digital products, a value of a derived digital product corresponding to a combined value of the inherited revenue values associated with the ancestor digital products from which the derived digital product is derived.

20. The apparatus as claimed in claim 19 including a rendering engine to render textured chat messages in a 3D chat scene along with the digital product.

\* \* \* \* \*